United States Patent [19]

Wagner

[11] Patent Number: 4,815,140

[45] Date of Patent: Mar. 21, 1989

[54] CIRCUIT ARRANGEMENT FOR SUPPRESSING OSCILLATIONS

[75] Inventor: Juergen Wagner, Kueps, Fed. Rep. of Germany

[73] Assignee: Siemens Aktiengesellschaft, Berlin and Munich, Fed. Rep. of Germany

[21] Appl. No.: 152,326

[22] Filed: Feb. 4, 1988

[30] Foreign Application Priority Data

Feb. 17, 1987 [DE] Fed. Rep. of Germany ....... 3704999

[51] Int. Cl.[4] .......................... H04M 1/20; H04R 3/02

[52] U.S. Cl. .......................................... 381/93; 381/83

[58] Field of Search .................... 381/93, 83, 23.1, 60, 381/68, 121; 330/149; 455/302, 305

[56] References Cited

U.S. PATENT DOCUMENTS

| | | | |
|---|---|---|---|
| 4,079,199 | 3/1978 | Patronis, Jr. . | |
| 4,091,236 | 5/1978 | Chen . | |
| 4,232,192 | 11/1980 | Beex . | |
| 4,525,856 | 6/1985 | Admiraal | 381/93 |
| 4,747,144 | 5/1988 | Admiraal | 381/93 |

OTHER PUBLICATIONS

RIM Electronic brochure, "Automatisches Ruckkopplungsfiltergerat AFG" (Automatic Feedback Filter), May 1986.

"Excerpt from Halbleiter-Schaltungstechnik", Tietze et al (1985), pp. 419–421.

"A Feedback Stabilizing Circuit for Hearing Aids", Preves, Hearing Instruments, vol. 37, No. 4, pp. 34, 36–41, and 51.

*Primary Examiner*—Tommy P. Chin

*Attorney, Agent, or Firm*—Hill, Van Santen, Steadman & Simpson

[57] ABSTRACT

A circuit arrangement for suppressing oscillations, such as acoustic feedback in a hearing aid, has a circuit which recognizes the presence of oscillations in a useful signal, an oscillatory frequency search circuit, and an oscillation modifying circuit controlled by the search circuit. The oscillation modifying circuit suppresses oscillations by filtering. Drift effects are avoided by a frequency clamp-on sub-circuit in the search circuit, which retains the frequency of the recognized oscillation at the modifying circuit, even when the oscillatory signal at the input of the search circuit disappears.

20 Claims, 4 Drawing Sheets

CIRCUIT ARRANGEMENT FOR SUPPRESSING OSCILLATIONS

BACKGROUND OF THE INVENTION

1. Field of the Invention

The present invention relates to a circuit arrangement for suppressing oscillations, and in particular to such a circuit arrangement for suppressing acoustic feedback in a hearing aid.

2. Related Application

The subject matter of the present application is related to the subject matter of a co-pending application of the same inventor, filed simultaneously herewith, entitled Circuit Arrangement For Suppressing Oscillations, Ser. No. 152,390.

3. Description of the Prior Art

The risk of acoustic feedback is present in electronic systems having a microphone and a speaker in relatively close proximity to each other. Hearing aids are particularly susceptible to such feedback effects because the acoustic transducers (microphones and earpieces, or receivers) are disposed only a slight distance from each other. This results in disturbing tones such as, for example, a whistling effect, to be experienced by the wearer.

In hearing aids, efforts have been undertaken to reduce the susceptibility of the hearing aid to feedback oscillation mainly by constructing the auditory channel, and by improving the sound-insulating capability of the plastic used to make the ear mold. Efforts have also been undertaken from an electrical standpoint, however these have been limited to clipping or shifting the frequency band, rather than attacking the oscillatory signal itself. For example, constant attenuation of the output signal is described in "A Feedback Stabilizing Circuit For Hearing Aids," by D. Preves in "Hearing Instruments", Vol. 37, No. 4, pages 34, 36–41 and 51.

Other circuits have recently been developed (for example as offered by RIM-Elektronik of Munich, West Germany, and the circuits described in U.S. Pat. Nos. 4,232,192 and 4,079,199) which recognize oscillations, and take steps to suppress the oscillations. Such circuits take the useful signal between the input transducer and a final amplifier, which precedes the output transducer, and amplify the signal with an additional amplifier. The amplified signal is compared to a threshold voltage in a comparator stage, and is supplied to a phase-locked loop (PLL). The PLL recognizes an oscillation when it occurs, and forwards a suppress signal to a notch filter, preceding the final amplifier. The notch filter suppresses the frequency range of the oscillation, or reduces the gain, as in the case of the circuit described in U.S. Pat. No. 4,079,199. As is known, however, when the input signal falls off, a PLL becomes unstable and drifts. The result of the drift is a periodic, acoustic noise signal.

Another oscillation-suppressing circuit is described in U.S. Pat. No. 4,091,236. In this known circuit, the filter used therein skips to a prescribed frequency when the oscillation ceases. A risk of drift when the input signal appears is also present in this circuit, however, because the circuit generates oscillation recognition signals as soon as input signals having irregular periods (the normal case) are no longer acquired

SUMMARY OF THE INVENTION

It is an object of the present invention to provide an oscillation-suppressing circuit which recognizes the presence of an oscillation in a useful signal, suppresses the oscillation, and remains stable, i.e., does not begin to drift, when the input signal disappears The above object is achieved in a circuit arrangement wherein an oscillation-recognizing circuit identifies the presence of an oscillation in a useful signal and an oscillatory frequency search circuit controls an oscillation modifying circuit to suppress the oscillation by means of a filter. Drift effects are avoided by a clamp-on sub-circuit in the search circuit, which retains the frequency in the oscillation modifying circuit of the recognized oscillation, even when the oscillatory signal at the input of the search circuit disappears.

In accordance with the principles of the present invention, the oscillatory frequency search circuit takes the place of the PLL in conventional circuits, and further the oscillatory frequency search circuit includes a clamp-on sub-circuit, which continues to generate an output signal after the disappearance of the oscillation. This output signal holds the oscilltion modifying circuit, for example, a notch filter, in a permanently set condition. Acoustic noise signals which may arise in the filter circuit, due to drifting thereof, therefore do not occur.

In one embodiment, the circuit arrangement is connected between the final amplifier and the output transducer of an acoustic system, which eliminates the need for the additional amplifier used in certain of the prior art approaches. This permits the circuit arrangement to be constructed economically and, as is particularly useful in hearing aids, in a smaller volume than conventional circuits.

DESCRIPTION OF THE PREFERRED EMBODIMENTS

Figure 1:
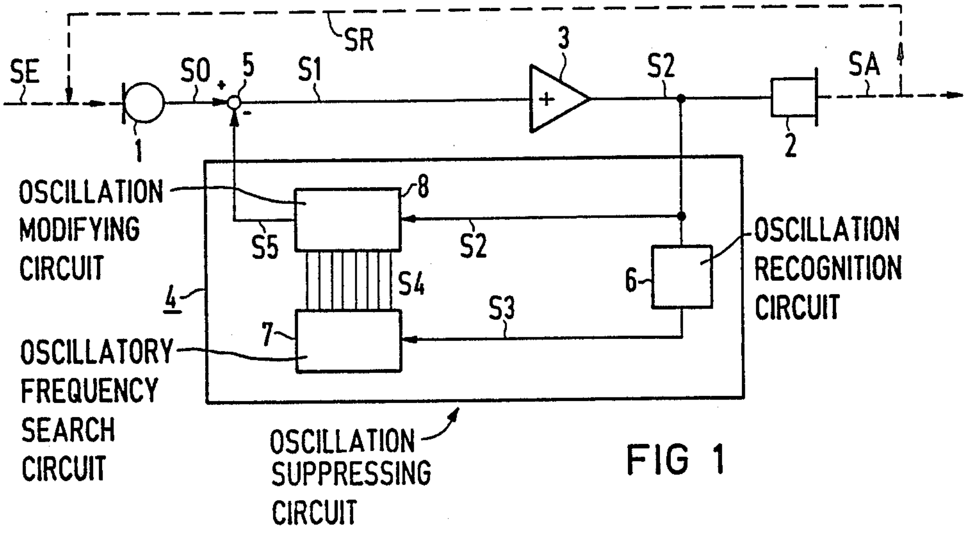
FIG. 1 is a schematic block diagram of an acoustic system, such as a hearing aid, including a circuit arrangement for suppressing oscillations constructed in accordance with the principles of the present invention.

An acoustic system, such as a hearing aid, is generally shown in FIG. 1 including a circuit arrangement constructed in accordance with the principles of the present invention for suppressing oscillations, such as feedback effects.

The oscillation-suppressing circuit is generally referenced at 4, and is constructed in the manner of an electrical feedback circuit. The circuit suppresses electrical signals which are generated as a consequence of acoustic feedback effects, which usually result in unattenuated oscillations in the remainder of the circuit. The feedback effect is schematically indicated in FIG. 1 by the dashed line arrow between the acoustic output transducer 2 and the microphone 1.

An acoustic useful signal SE, together with the acoustic feedback signal SR, are converted into an electrical signal SO in the microphone 1. The output signal S5 of the oscillation-suppressing circuit 4 is subtracted from this signal SO in a subtraction element 5. The remaining signal S1 is amplified in a non-inverting final amplifier 3 to form a signal S2. In the output transducer 2, this signal S2 is converted into an acoustic signal SA. At the same time, the signal S2 is supplied to the oscillation suppressing circuit 4 as an input signal.

Analyzed in terms of function, the oscillation-suppressing circuit 4 includes an oscillation recognition circuit 6, an oscillatory frequency search circuit 7, and an oscillation modifying circuit 8. In the oscillation-suppressing circuit 4, the signal S2 is conducted to the oscillation recognition circuit 6, and is also supplied to the modifying circuit 8. A check is undertaken in the recognition circuit 6 to determine whether the signal S2 contains an oscillation arising from acoustic feedback effects. If an oscillation is present, the recognition circuit 6 generates an output signal S3. The signal S3 places the oscillatory frequency search circuit 7 in operation, causing a sequence of signals S4 to be generated as an output by the serach circuit 7, until the signal S3 at the output of the recognition circuit 6 disappears. The signal S4 at the output of the search circuit 7 when the signal S3 disappears is maintained by the search circuit 7 until a new oscillation appears. The signals S4 control the modifying circuit 8 such that frequency ranges in the overall frequency spectrum of the signal SO, which are allocated to the recognized oscillation, are substantially suppressed. As described above, the signal S5 is the output signal of the oscillation-suppressing circuit 4.

Figure 2:
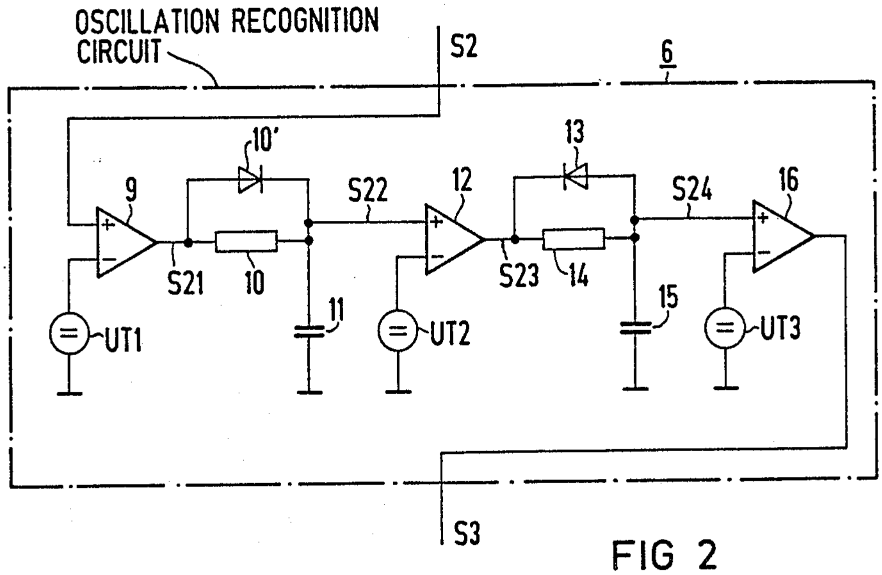
FIG. 2 is a circuit diagram showing details of the oscillation recognition circuit in the circuit arrangement constructed in accordance with the principles of the present invention.

The details of the oscillation recognition circuit 6 are shown in FIG. 2. Because oscillations are long-lasting alternating voltages having relatively large amplitude and relatively high frequency, the recognition circuit 6 checks the input signal S2 for these characteristics. In a first stage, the amplitude of the input signal S2 is compared to a first threshold voltage UT1 in a first comparator 9. If the amplitude of the signal S2 upwardly exceeds the threshold UT1, a rectangular voltage signal S21 is generated.

The following stage in the recognition circuit 6 includes an RC element consisting of an ohmic resistor 10, a diode 10' and a capacitor 11, and also includes a second comparator 12. The capacitor 11 is rapidly charged by the signal S21 via the diode 10', and is in turn discharged via the resistor 10 with a prescribed time constant. This time constant, together with the threshold voltage UT2 of the second comparator 12, define the minimum frequency to which the oscillation recognition 6 responds. If a short time constant is selected, the recognition circuit 6 essentially responds only to high-frequency signals. Given low-frequency signals, the capacitor 11 has enough time to discharge below the threshold voltage UT2 of the second comparator 12. These low-frequency signals, therefore, are not acquired. It is thus assured that the recognition circuit 6 only reacts to signals which result from acoustic feedback effects, and signal components appearing periodically with low frequency in the useful signal (for example a voice signal) do not trigger a response in the recognition circuit 6.

When the oscillation criteria of "high amplitudes" and "high frequencies" have been met in the first and second stages of the recognition circuit 6, output signals S23 are supplied to a third stage of the recognition circuit 6. The output signals S23 are rectangular voltage signals having a respective duration equal to the time which the signals S22 exceed the threshold of the comparator 12. The signals S23 thus reflect the duration of the large amplitude, high frequency input signal. The third stage of the recognition circuit 6 includes a diode 13, an RC element consisting of a resistor 14 and a capacitor 15, and a third comparator 16. The capacitor 15 is charged with the signal S23 via the resistor 14. The resistor 14 and the capacitor 15 are dimensioned such that the charging time constant is high, for example, 0.5 through 2 seconds. The capacitor 15 is immediately discharged via the diode 13 when the output voltage S23 drops even briefly. If, however, the rectangular signal S23 lasts for a longer time, the capacitor 15 is charged to such an extent that the voltage upwardly exceeds the threshold UT3 of the third comparator 16. In this instance, the input signal S2 meets all of the oscillation recognition criteria, and the signal S3 is generated by the comparator 16 as an output of the recognition circuit 6, indicating the presence of an oscillation.

Figure 3:
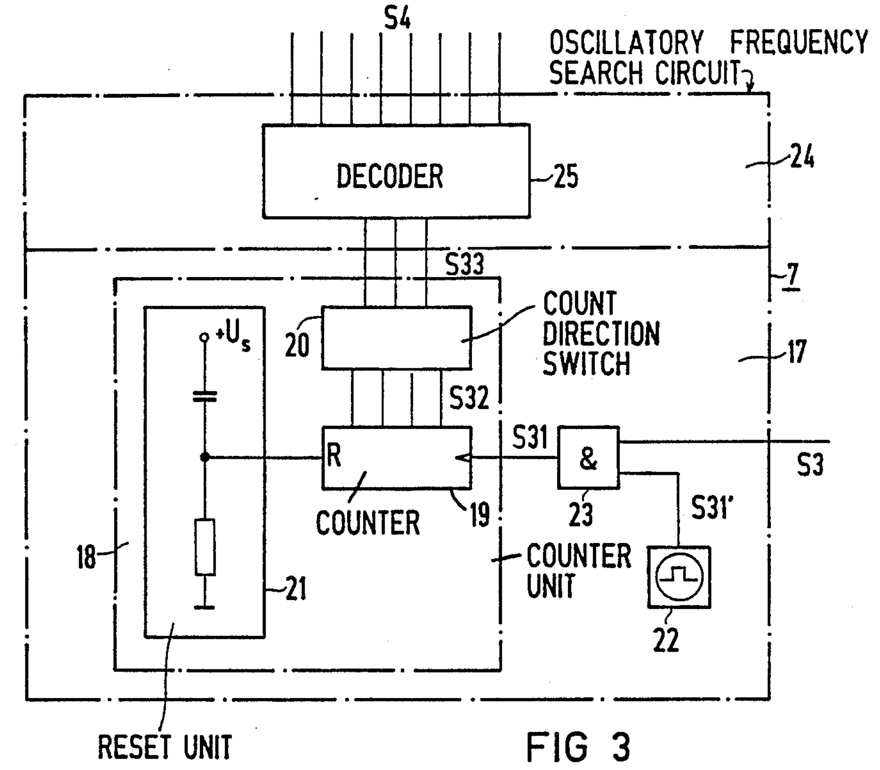
FIG. 3 is a schematic block diagram of an oscillatory frequency search circuit for the circuit arrangement constructed in accordance with the principles of the present invention.

The details of an oscillatory frequency search circuit constructed in accordance with the principles of the present invention are shown in FIG. 3. The search circuit 7 is connected between the recognition circuit 6 and the modifying circuit 8, and controls the modifying circuit 8 so that recognized oscillations are suppressed. A first stage 17 of the search circuit 7 generates digital, frequency-defining signals S33, and is controlled by the output signals S3 from the recognition circuit 6. The main component of the first stage 17 is a counter unit 18 which includes a counter 19, a counting direction switch 20, and a reset element 21, also referred to as a "power-on reset." The first stage 17 also includes an oscillator 22 and an AND gate 23. The counter 19 simultaneously serves as a clamp-on means for the frequencies of the recognized oscillation, as described in greater detail below.

When the search circuit 7 is energized, the reset element 21 sets all of the output signals S32 at all four output lines of the counter 19 to zero (also referred to as the "low" status). This 0000 status is digitally incremented by 1 each time a pulse S32 ("high") is registered at the input of the counter 19. When all four output lines have been switched to "high" the original zero condition is produced again upon the occurrence of the next pulse S31, and the incrementation sequence is repeated. A pulse S31, however, is only generated if an output signal S3 from the recognition circuit 6 is present at one input of the AND gate 22 preceding the counter 19. If such a signal is present, pulses S31', generated by the oscillator 22, are forwarded as the incrementation pulses S31. The oscillator 22 therefore defines the speed at which the counter 19 is incremented.

The counter 19 increments the output pulses S32 until the output signal S3 from the recognition circuit 6 disappears. (The signal S3 disappears when the oscillation has been suppressed by the modifying circuit 8, as described below). When the signal S3 disappears, the counter 19 receives no further pulses S31, and remains in its current state, until a new output signal S3 from the recognition circuit 6 appears. The counter 19 thus stores the state or condition which has been set, and together with the AND gate 23, functions as a clamp-on means for retaining the frequency of the recognized oscillation at the modifying circuit 8. It is preferable to include such a clamp-on means in the search circuit 7 to prevent the oscillation suppression circuit 4 from drifting, and thus avoiding the reappearance of a previously suppressed oscillation.

The first stage 17 of the search circuit 7 also includes a count direction switch 20 at the output of the counter 19. The switch 20 has three output lines, and prevents a discontinuous "skip" from the count 111 to 000 in the frequency-defining output signals S33. This is accomplished by decrementing every second sequence from 111 to 000 by inverting the input signals S32. Avoidance of such a "skip" is preferable so that the filter in the modifying circuit 8 for suppressing the oscillatory frequency does not jump from one end of the frequency spectrum to the other given a reversal of the counting direction, but instead migrates back and forth in the frequency spectrum.

A second stage in the search circuit 7 samples the frequency-defining signals 33 from the first stage 17 (received from the switch 20) and controls the modifying circuit 8 by output signals S4. The second stage 24 includes a decoder 25 which transfers the eight possible signal combinations via the three incoming lines onto eight different output lines. These eight signals S4 control the modifying circuit 8 to define the frequency range in the selectable frequency spectrum which is to be filtered by the modifying circuit 8.

The decoder 25 thus cycles through each of the frequency ranges, as long as the frequency-defining signals S23 are continually changing by virtue of the incrementing count of the counter 19, which increments as long as the signal S3 is present. When the frequency range containing the unwanted oscillation is cycled through, and thus that frequency range is suppressed, as described below, and the oscillation is also suppressed, the signal S3 disappears and the counter 19 is no longer incremented, so the decoder 25 no longer cycles, but an output signal for the frequency range which successfully suppressed the oscillation is retained, as described above, by the clamp-on means.

Figure 4:
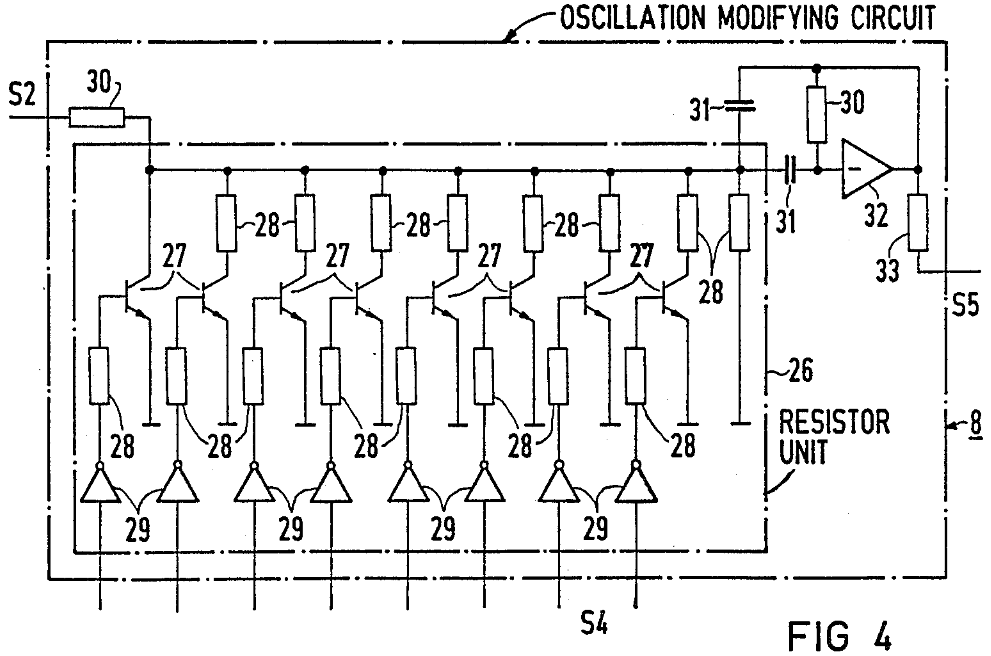
FIG. 4 is a circuit diagram of a first embodiment of an oscillation modifying circuit in a circuit arrangement constructed in accordance with the principles of the present invention, in the form of a notch filter.

The decoder 25 controls the modifying circuit 8 by means of a discretely variable resistor bank 26, as shown in FIG. 4. Given an existing oscillation, the signals S4 are conducted via one or more lines of the resistor unit 26. Each line includes at least one transistor 27, one ohmic resistor 28, and one inverter 29, the resistors 28 having respectively different resistance values. If an oscillation is not present (i.e., signal S33 is 000), all transistors 27 are in a conducting state (by inversion of the signals S4 in the inverters 29). Given a signal S33 of 111, by contrast, all of the transistors 27 are in a non-conducting, or inhibiting, state. The resistance values of the resistors 28 are preferebly selected so that the modifying circuit 8 selects eight adjacent frequency ranges between 1 kHz through infinity. It is also preferable that at least one transistor-resistor combination permits selection of a frequency range above the acoustic limit of human hearing, so that only this range is filtered after the apparatus is energized and before an oscillation appears.

The modifying circuit 8 also includes a further ohmic resistors 30, capacitors 31, and an amplifier 32, which are connected in the form of a bandpass filter. Such a filter is known, for example, from the book "Halbleiter-Schaltungs Technik," (Semiconductor Circuit Technique) by Teitze and Schenk, 7th Edition (1985) at pages 419∝421. Because the bandpass filter generates negative feedback for the final amplifier 3, the modifying circuit 8 simulates a notch filter which forms an acceptor circuit at the resonant frequency. The bandwidth and the gain of the simulated filter are dependent on the discretely variable resistor unit 26. The resonant frequency can thus be varied by changing the values of resistance in the resistor unit 26 without influencing the bandwidth or gain. An output resistor 33 defines the weighting of the feedback signal S5 at the subtraction element 5 (shown in FIG. 1).

Figure 5:
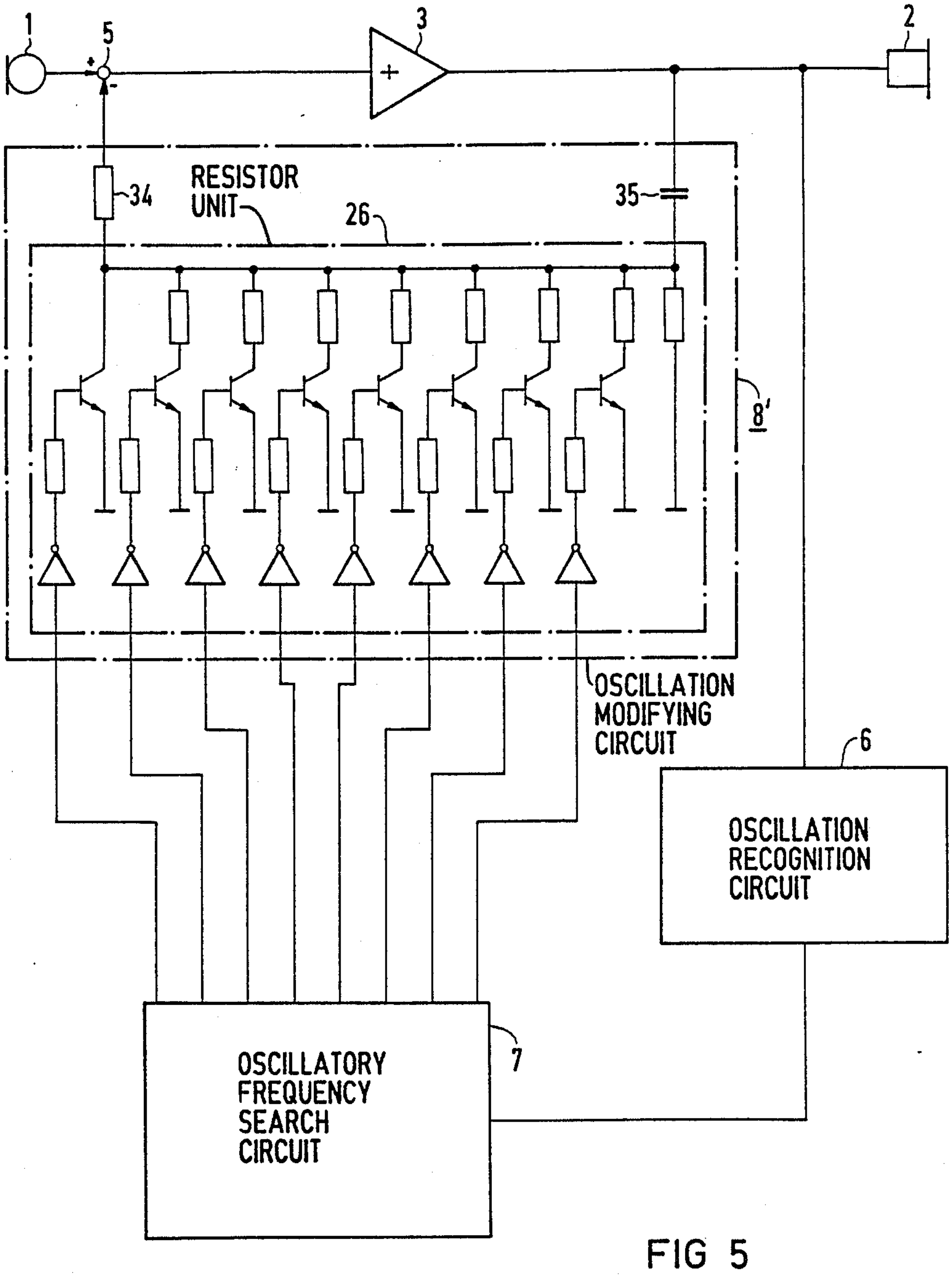
FIG. 5 is a circuit diagram of a further embodiment of the circuit arrangement constructed in accordance with the principles of the invention wherein the oscillation modifying circuit is in the form of a high pass filter.

Another embodiment of a modifying circuit 8' is shown in FIG. 5. In this embodiment, a C-R high-pass filter is used instead of a bandpass filter. By means of the discretely variable resistor 26, a resistor 24 and a capacitor 25, this filter simulates a variable capacitor, and enables smoothing of the acoustic feedback curve, and exhibits a low-pass effect. The recognition circuit 6 and the search circuit 7 as described above can be used with the further embodiment of the modifying circuit 8'.

Other embodiments of the modifying circuit 8 not described in detail herein are also possible. The modifying circuit may alternatively be fashioned, for example, as a phase shifter, a phase switcher, or a gain reducing circuit.

Figure 6:
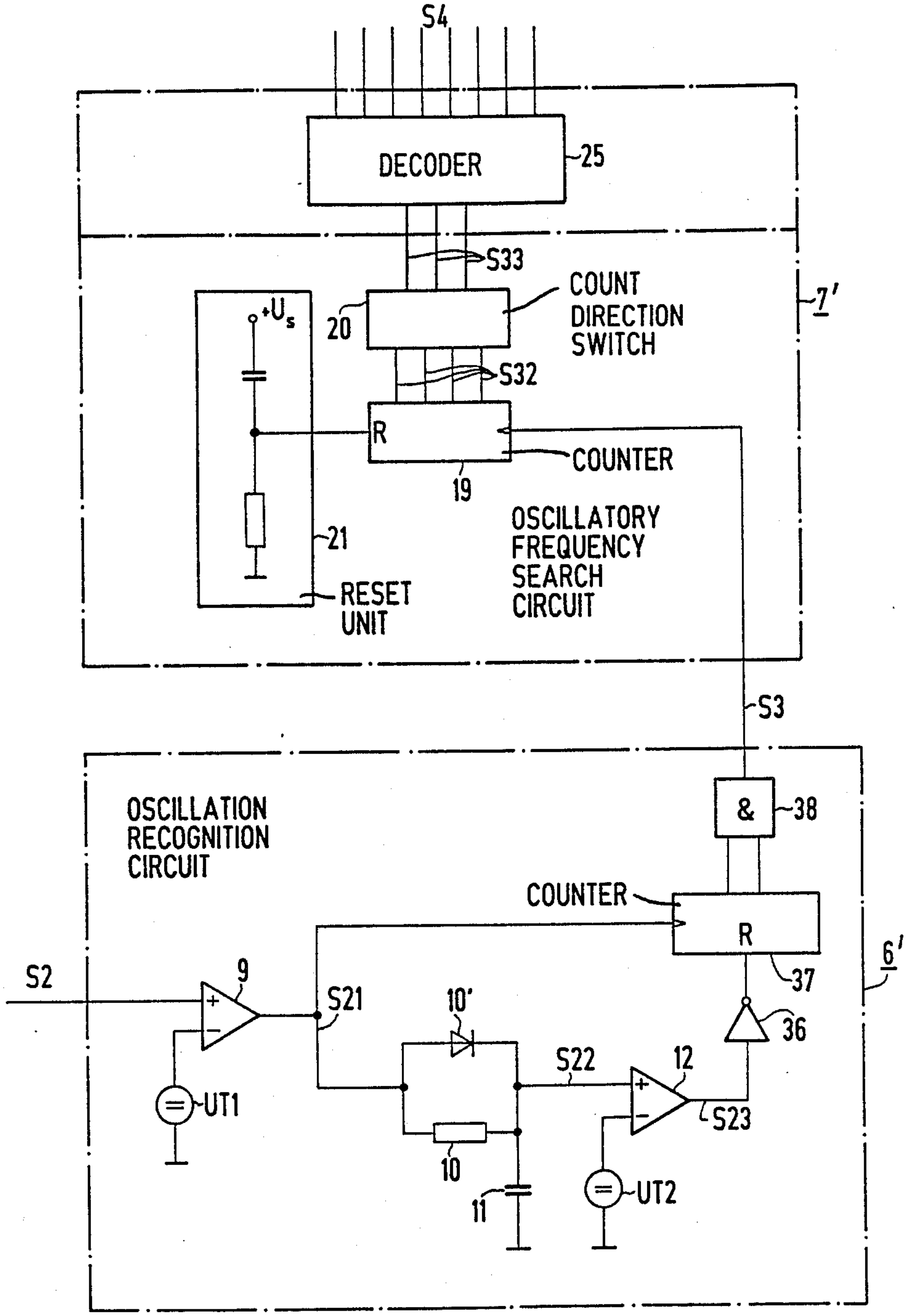
FIG. 6 shows a circuit diagram of further embodiments of an oscillation recognition circuit and an oscillatory frequency search circuit connected thereto, in a circuit arrangement constructed in accordance with the principles of the present invention.

The recognition circuit 6 and the search circuit 7 may also be modified. Modified versions 6' and 7' of those circuits are shown in FIG. 6. In this embodiment, the third stage (consisting of components 13 through 16 in FIG. 2) of the recognition circuit 6 is replaced in the recognition circuit 6' by a counter stage which includes an inverter 36, a digital counter 37, and an AND gate 38.

In the same manner as described in connection with FIG. 2, the input signal is examined for the oscillatory characteristics of "high amplitude" and "high frequencies." An output signal S23, however, in the embodiment of 6' is digitally processed to determine whether the large amplitude, high-frequency input signal is long-lasting. The counter 37 compares two signal inputs. One input is the rectangular voltage signals S21, and the other input is a reset input which, in combination with the inverter 36, constantly resets the counter 37 to zero except when a signal S23 appears. The counter 37 counts the rectangular signals S21 as long as a signal S23 is present. After the occurrence of a selected number of signals S21, the input signal is recognized as an oscillation. Together with the AND gate 38, the counter 37 generates incrementing pulses S3 in response thereto. These incrementing pulses can be directly forwarded to the counter 19 of the search circuit 7'. The search circuit 7' thus does not require an oscillator, in contrast to the search circuit 7.

Although other modifications and changes may be suggested by those skilled in the art it is the intention of the inventor to embody within the patent warranted hereon all changes and modifications as reasonably and properly come within the scope of his contribution to the art.

I claim as my invention:

1. In an acoustic system having an acoustic input transducer and an acoustic output transducer, a circuit for suppressing oscillations due to feedback between said acoustic input and output transducers, said circuit comprising:

means for recognizing the presence of an oscillation due to said feedback in a signal line between said acoustic input and output transducers, and generating a signal upon recognition of said oscillation for as long as said oscillation is present;

oscillatory frequency search means connected to said means for recognizing for searching for, in the presence of said signal from said means for recognizing, the frequency of said oscillation, and generating a signal corresponding to said frequency;

oscillation modifying means connected to said signal line and to said oscillatory frequency search means for suppressing said oscillation in response to said signal from said oscillatory frequency search means; and clamp-on means in said oscillatory frequency search means for continuing to generate said signal corresponding to the frequency of said oscillation, even upon the disappearance of said signal from said means for recognizing, until a new oscillation due to said feedback is recognized by said means for recognizing.

2. A circuit as claimed in claim 1, wherein said acoustic system has a final amplifier preceding said acoustic output transducer, and wherein said means for recognizing is connected between said final amplifier and said acoustic output transducer.

3. A circuit as claimed in claim 1, wherein said oscillatory frequency search circuit comprises:

means for generating a plurality of frequency defining signals during the presence of said signal from said means for recognizing;

means for cycling through a plurality of frequencies supplied to said oscillation modifying means in response to said frequency-defining signals; and wherein said means for generating said frequency-defining signals includes said clamp-on means, said clamp-on means including means for retaining a current frequency-defining signal present upon the disappearance of said signal from said means for recognizing, said clamp-on means including means for controlling said means for generating said frequency-defining signals to continue to supply said last frequency-defining signal to said means for cycling to hold said means for cycling at a frequency range corresponding to said last frequency-defining signal.

4. A circuit as claimed in claim 3, wherein said oscillatory frequency search means further includes means connected to said means for generating said frequency-defining signals for causing said frequency-defining signals to successively change at a selected rate.

5. A circuit as claimed in claim 4, wherein said means for generating said frequency-defining signals includes a counter, and wherein said means for causing said frequency-defining signals to successively change is an oscillator which generates pulses at said selected rate to increment said counter, each counter increment causing generation of a different frequency-defining signal.

6. A circuit as claimed in claim 5, further comprising a AND gate having a first input connected to said oscillator and a second input to which said signal from said means for recognizing is supplied, and an output connected to said counter such that said counter is incremented only in the presence of said signal from said means for recognizing.

7. A circuit as claimed in claim 3, wherein said means for cycling has a lowest frequency range with a lowest frequency limit of 1 kHz.

8. A circuit as claimed in claim 3, wherein said means for generating frequency-defining signals is a means for generating eight frequency-defining signals, and wherein said means for cycling is a means for cycling through eight different frequencies respectively corresponding to said frequency-defining signals.

9. A circuit as claimed in claim 3, wherein said frequency modifying means includes a discretely variable resistor bank, said resistor bank assuming a different discrete resistance value for each of said frequency-defining signals.

10. A circuit as claimed in claim 3, wherein said means for cycling is a decoder.

11. A circuit as claimed in claim 3, wherein said frequency ranges in combination comprise a frequency spectrum having opposite ends, and wherein said means for generating frequency-defining signals includes means for preventing a skip in said means for cycling from one end of said frequency spectrum to the other end.

12. A circuit as claimed in claim 11, wherein said means for generating frequency-defining signals includes a counter, with the frequency-defining signals corresponding to the count of said counter, and wherein said means for preventing a skip is a count direction switch which reverses the counting direction when selected limit counter readings corresponding to each of said ends of said frequency spectrum are reached.

13. A circuit as claimed in claim 1, wherein said acoustic system includes a final amplifier preceding said acoustic output transducer, and wherein said circuit is connected as a feedback element across said final amplifier.

14. A circuit as claimed in claim 1, wherein said oscillation modifying means is a bandpass filter.

15. A circuit as claimed in claim 1, wherein said oscillation modifying means is a C-R high pass filter.

16. A circuit as claimed in claim 3, wherein said means for generating frequency-defining signals includes a counter, each counter increment causing a change in said frequency-defining signals, and wherein said means for recognizing includes means for generating pulses for incrementing said counter as long as said oscillation is present.

17. In an acoustic system having an acoustic input transducer and an acoustic output transducer, a circuit for suppressing oscillations due to feedback between said acoustic input and output transducers, said circuit comprising:

means for recognizing the presence of an oscillation due to said feedback in a signal line between said acoustic input and output transducers, and generating a signal upon the recognition of said oscillation for as long as the oscillation is present;

oscillatory frequency search means connected to said means for recognizing for cycling through, in the presence of said signal from said means for recognizing, a plurality of frequency ranges and generating respective signals corresponding to each frequency range;

filter means connected to said signal line and to said oscillatory frequency search means for suppressing said oscillation, said filter means including a resistor bank having a plurality of discretely selectable resistance values, said resistance values being respectively selected by said signals respectively corresponding to said frequency ranges; and clamp-on means in said oscillatory frequency search means for causing said oscillatory frequency search means to retain and continue to generate one of said signals corresponding to a frequency range which successfully suppresses said oscillation, said clamp-on means causing said signals corresponding to said frequency ranges to continue to be generated even upon the disappearance of said signal from said means for recognizing, until a new oscillation due to said feedback is recognized by said means for recognizing.

18. A circuit as claimed in claim 1, wherein said filter means is a bandpass filter.

19. A circuit as claimed in claim 1, wherein said filter means is a C-R high pass filter.

20. A circuit as claimed in claim 1, wherein said acoustic system includes a final amplifier connected in said signal line preceding said acoustic output transducer, and wherein said circuit is connected as a feedback element across said final amplifier.

* * * * *